United States Patent
Hara

(10) Patent No.: US 10,150,533 B1
(45) Date of Patent: Dec. 11, 2018

(54) BICYCLE CRANK ASSEMBLY

(71) Applicant: SHIMANO INC., Sakai (JP)

(72) Inventor: Nobukatsu Hara, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/839,723

(22) Filed: Dec. 12, 2017

(51) Int. Cl.
*B62M 3/00* (2006.01)
*B62M 1/36* (2013.01)

(52) U.S. Cl.
CPC ............. *B62M 3/00* (2013.01); *B62M 1/36* (2013.01)

(58) Field of Classification Search
CPC .......... B62M 1/36; B62M 3/00; B62M 3/003; B62M 9/10; B62M 9/105; F16H 55/30; F16H 2055/306; B62K 19/34; Y10T 74/2164; Y10T 74/2165; Y10T 74/2167
See application file for complete search history.

(56) References Cited

U.S. PATENT DOCUMENTS

| | | | |
|---|---|---|---|
| 5,335,928 A * | 8/1994 | Pong | B62M 3/003 280/259 |
| 5,782,713 A * | 7/1998 | Yang | B62M 3/00 280/259 |
| 8,573,093 B2 * | 11/2013 | Valle | B62M 3/00 474/160 |
| 8,590,421 B2 * | 11/2013 | Meggiolan | B62K 19/34 384/458 |
| 9,394,987 B2 * | 7/2016 | Pfeiffer | B62M 9/105 |
| 9,725,132 B2 * | 8/2017 | Hara | B62M 1/36 |
| 9,862,454 B2 * | 1/2018 | Hara | B62M 1/36 |
| 10,066,673 B2 * | 9/2018 | Hara | B62M 1/36 |
| 2009/0045600 A1 * | 2/2009 | Garnier | B62M 3/003 280/281.1 |
| 2016/0368561 A1 * | 12/2016 | Kamada | B62M 9/105 |
| 2017/0167542 A1 * | 6/2017 | Hara | B62M 1/36 |
| 2017/0247081 A1 * | 8/2017 | Sugimoto | B62M 9/10 |
| 2017/0274961 A1 * | 9/2017 | Hara | B62M 9/124 |
| 2018/0180157 A1 * | 6/2018 | Akanishi | F16H 55/30 |

* cited by examiner

*Primary Examiner* — Adam D Rogers
(74) *Attorney, Agent, or Firm* — Mori & Ward, LLP

(57) ABSTRACT

A bicycle crank assembly comprises a sprocket unit and a crank axle. The sprocket unit includes a sprocket having a rotational center axis. The sprocket includes a plurality of driving teeth. A total number of the plurality of driving teeth is equal to or larger than 38. The crank axle extends along the rotational center axis. The sprocket unit is movable relative to the crank axle in an axial direction of the rotational center axis within a movable range having an axial length equal to or smaller than 8 mm.

19 Claims, 8 Drawing Sheets

| EMBODIMENT MODIFICATIONS | TOTAL NUMBER OF DRIVING TEETH |
|---|---|
| EMBODIMENT | 38 |
| MODIFICATION 1 | 39 |
| MODIFICATION 2 | 40 |
| MODIFICATION 3 | 41 |
| MODIFICATION 4 | 42 |
| MODIFICATION 5 | 43 |
| MODIFICATION 6 | 44 |
| ⋮ | ⋮ |
| MODIFICATION 17 | 55 |

*FIG. 4*

BICYCLE CRANK ASSEMBLY

BACKGROUND OF THE INVENTION

Field of the Invention

The present invention relates to a bicycle crank assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a crank assembly.

SUMMARY OF THE INVENTION

In accordance with a first aspect of the present invention, a bicycle crank assembly comprises a sprocket unit and a crank axle. The sprocket unit includes a sprocket having a rotational center axis. The sprocket includes a plurality of driving teeth. A total number of the plurality of driving teeth is equal to or larger than 38. The crank axle extends along the rotational center axis. The sprocket unit is movable relative to the crank axle in an axial direction of the rotational center axis within a movable range having an axial length equal to or smaller than 8 mm.

With the bicycle crank assembly according to the first aspect, it is possible to reduce interference between the sprocket unit and a chain stay of a bicycle frame with increasing the total number of the plurality of driving teeth.

In accordance with a second aspect of the present invention, the bicycle crank assembly according to the first aspect is configured so that the plurality of driving teeth is movable relative to the crank axle between a first axial position and a second axial position in the axial direction. The movable range is defined between the first axial position and the second axial position.

With the bicycle crank assembly according to the second aspect, it is possible to effectively reduce interference between the sprocket unit and a chain stay with increasing the total number of the plurality of driving teeth.

In accordance with a third aspect of the present invention, the bicycle crank assembly according to the second aspect is configured so that the first axial position is provided between the second axial position and a crank center plane of the bicycle crank assembly in the axial direction.

With the bicycle crank assembly according to the third aspect, it is possible to effectively reduce interference between the sprocket unit and a chain stay with increasing the total number of the plurality of driving teeth.

In accordance with a fourth aspect of the present invention, the bicycle crank assembly according to the third aspect further comprises a crank arm including an axially innermost surface which is the closest to the crank center plane in the axial direction in the crank arm. The plurality of driving teeth is provided between the axially innermost surface and the crank center plane in the axial direction in a state where the plurality of driving teeth is in the first axial position.

With the bicycle crank assembly according to the fourth aspect, it is possible to move a chain line more toward the crank center plane in the axial direction.

In accordance with a fifth aspect of the present invention, the bicycle crank assembly according to the fourth aspect is configured so that an axial distance is defined between the axially innermost surface and a plurality of tooth tips of the plurality of driving teeth in the axial direction in the state where the plurality of driving teeth is in the first axial position. The axial distance is equal to or smaller than 4 mm.

With the bicycle crank assembly according to the fifth aspect, it is possible to reduce interference between a bicycle frame and the plurality of driving teeth in the state where the plurality of driving teeth is in the first axial position.

In accordance with a sixth aspect of the present invention, the bicycle crank assembly according to any one of the third to fifth aspects is configured so that the sprocket unit includes an axially outermost end which is the farthest from the crank center plane in the axial direction in the sprocket unit. The crank arm includes an axially outermost surface which is the farthest from the crank center plane in the axial direction in the crank arm. The axially outermost end of the sprocket unit is positioned in an axial position equal to an axial position of the axially outermost surface in a state where the sprocket unit is in the second axial position, or positioned in an axial position closer to the crank center plane than the axially outermost surface in the axial direction in the state where the sprocket unit is in the second axial position.

With the bicycle crank assembly according to the sixth aspect, it is possible to reduce interference between the sprocket unit and a rider's leg in the state where the sprocket unit is in the second axial position.

In accordance with a seventh aspect of the present invention, the bicycle crank assembly according to any one of the first to sixth aspects is configured so that the sprocket unit includes a coupling member coupled to the sprocket to support the sprocket movably relative to the crank axle in the axial direction.

With the bicycle crank assembly according to the seventh aspect, it is possible to movably support the sprocket with the coupling member.

In accordance with an eighth aspect of the present invention, the bicycle crank assembly according to the seventh aspect is configured so that the coupling member includes an adaptor and a slidable member. The adaptor is coupled to the sprocket and is at least partly provided in an internal space of the crank axle. The slidable member slidably supports the adaptor with respect to the crank axle in the internal space of the crank axle.

With the bicycle crank assembly according to the eighth aspect, it is possible to utilize the internal space of the crank axle to make the bicycle crank assembly compact.

In accordance with a ninth aspect of the present invention, the bicycle crank assembly according to the eighth aspect is configured so that the adaptor includes a movable member and an attachment member. The movable member is movably provided in the internal space of the crank axle in the axial direction. The attachment member couples the sprocket to the movable member. The movable member is press-fitted and/or caulked to the attachment member.

With the bicycle crank assembly according to the ninth aspect, it is possible to enlarge the movable range of the sprocket unit.

In accordance with a tenth aspect of the present invention, the bicycle crank assembly according to any one of the third to ninth aspects is configured so that a minimum axial distance is defined between the crank center plane and the plurality of driving teeth in the axial direction in a state where the plurality of driving teeth is in the first axial position. The minimum axial distance is equal to or larger than 38 mm.

With the bicycle crank assembly according to the tenth aspect, it is possible to reduce interference between a bicycle frame and the plurality of driving teeth in the state where the plurality of driving teeth is in the first axial position.

In accordance with an eleventh aspect of the present invention, the bicycle crank assembly according to the tenth aspect is configured so that the minimum axial distance is equal to or larger than 40 mm.

With the bicycle crank assembly according to the eleventh aspect, it is possible to reduce interference between a bicycle frame and the plurality of driving teeth in the state where the plurality of driving teeth is in the first axial position even when the total number of the plurality of driving teeth is larger.

In accordance with a twelfth aspect of the present invention, the bicycle crank assembly according to any one of the first to eleventh aspects is configured so that the axial length of the movable range is equal to or smaller than 7 mm.

With the bicycle crank assembly according to the twelfth aspect, it is possible to reduce interference between a bicycle frame and the plurality of driving teeth in the state where the plurality of driving teeth is in the first axial position even when the total number of the plurality of driving teeth is larger.

In accordance with a thirteenth aspect of the present invention, the bicycle crank assembly according to the twelfth aspect is configured so that the axial length of the movable range is equal to or smaller than 5 mm.

With the bicycle crank assembly according to the thirteenth aspect, it is possible to reduce interference between a bicycle frame and the plurality of driving teeth in the state where the plurality of driving teeth is in the first axial position even when the total number of the plurality of driving teeth is larger.

In accordance with a fourteenth aspect of the present invention, the bicycle crank assembly according to the thirteenth aspect is configured so that the axial length of the movable range is equal to or larger than 4 mm.

With the bicycle crank assembly according to the fourteenth aspect, the axial length of the movable range improves chain-holding performance of the sprocket unit with increasing pedaling efficiency.

In accordance with a fifteenth aspect of the present invention, the bicycle crank assembly according to any one of the first to fourteenth aspects is configured so that the total number of the plurality of driving teeth is equal to or larger than 40.

With the bicycle crank assembly according to the fifteenth aspect, it is possible to reduce interference between the sprocket unit and a chain stay with further increasing the total number of the plurality of driving teeth.

In accordance with a sixteenth aspect of the present invention, the bicycle crank assembly according to the fifteenth aspect is configured so that the total number of the plurality of driving teeth is equal to or larger than 42.

With the bicycle crank assembly according to the sixteenth aspect, it is possible to reduce interference between the sprocket unit and a chain stay with further increasing the total number of the plurality of driving teeth.

In accordance with a seventeenth aspect of the present invention, the bicycle crank assembly according to any one of the first to sixteenth aspects is configured so that the total number of the plurality of driving teeth is equal to or smaller than 55.

With the bicycle crank assembly according to the seventeenth aspect, it is possible to reduce interference between the sprocket unit and a chain stay with further increasing the total number of the plurality of driving teeth.

In accordance with an eighteenth aspect of the present invention, the bicycle crank assembly according to any one of the first to seventeenth aspects is configured so that the sprocket has an outer diameter equal to or larger than 145 mm.

With the bicycle crank assembly according to the eighteenth aspect, it is possible to reduce interference between the sprocket unit and a chain stay with increasing the total number of the plurality of driving teeth.

In accordance with a nineteenth aspect of the present invention, the bicycle crank assembly according to any one of the first to eighteenth aspects further comprises a crank arm and an additional crank arm. The crank arm is secured to the crank axle. The crank arm includes a pedal-attachment surface. The additional crank arm is secured to the crank axle. The additional crank arm includes an additional pedal-attachment surface. A maximum axial distance is defined between the pedal-attachment surface and the additional pedal-attachment surface in the axial direction. The maximum axial distance is equal to or smaller than 150 mm.

With the bicycle crank assembly according to the nineteenth aspect, it is possible to reduce interference between the sprocket unit and a chain stay even when the pedal-attachment surface and the additional pedal-attachment surface are closer to the bicycle frame.

In accordance with a twentieth aspect of the present invention, the bicycle crank assembly according to any one of the first to nineteenth aspects is configured so that the plurality of driving teeth includes at least one first tooth and at least one second tooth. The at least one first tooth has a first axial width defined in the axial direction. The at least one second tooth has a second axial width defined in the axial direction. The first axial width is larger than the second axial width. The at least one first tooth is adjacent to the at least one second tooth in a circumferential direction of the rotational center axis without another tooth therebetween.

With the bicycle crank assembly according to the twentieth aspect, it is possible to further improve chain-holding performance of the sprocket unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 shows modifications of a total number of driving teeth provided in a sprocket unit of the bicycle crank assembly illustrated in FIG. 1.

DESCRIPTION OF THE EMBODIMENTS

Figure 1:
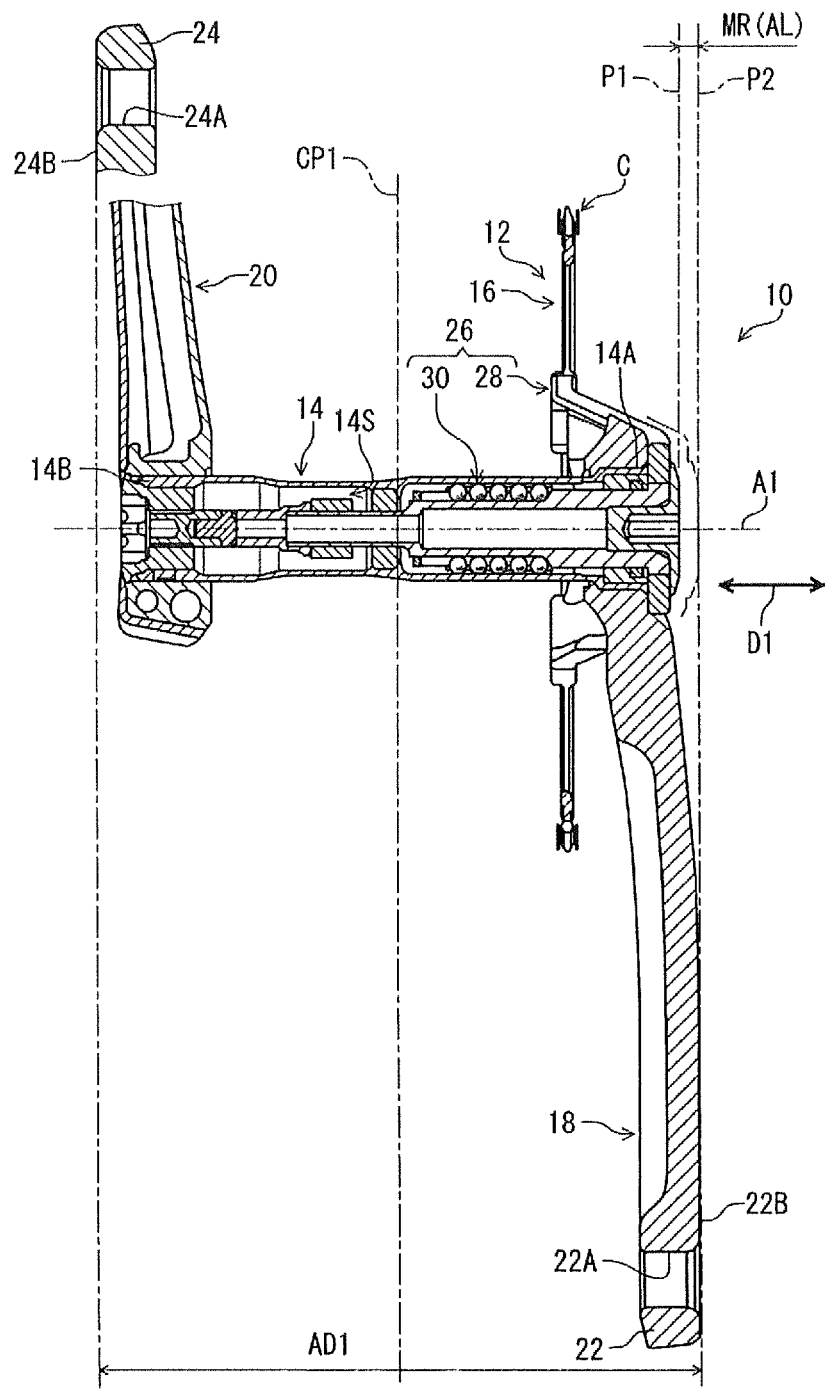
FIG. 1 is a cross-sectional view of a bicycle crank assembly in accordance with an embodiment (first axial position).

The embodiment(s) will now be described with reference to the accompanying drawings, wherein like reference numerals designate corresponding or identical elements throughout the various drawings.

Referring initially to FIG. 1, a bicycle crank assembly 10 in accordance with an embodiment comprises a sprocket unit 12 and a crank axle 14. The sprocket unit 12 includes a sprocket 16 having a rotational center axis A1. The crank axle 14 extends along the rotational center axis A1. The sprocket 16 is engaged with a bicycle chain C. In this embodiment, the sprocket 16 is a single sprocket in the sprocket unit 12. However, the sprocket unit 12 can include a plurality of sprockets.

The bicycle crank assembly 10 further comprises a crank arm 18. The bicycle crank assembly 10 further comprises an additional crank arm 20. The crank arm 18 is secured to the crank axle 14. The additional crank arm 20 is secured to the crank axle 14. The crank axle 14 includes a first crank-arm attachment end 14A and a second crank-arm attachment end 14B. The crank axle 14 extends between the first crank-arm attachment end 14A and the second crank-arm attachment end 14B along the rotational center axis A1. The crank arm 18 is attached to the first crank-arm attachment end 14A. The additional crank arm 20 is attached to the second crank-arm attachment end 14B. In this embodiment, the crank arm 18 is a right crank arm, and the additional crank arm 20 is a left crank arm. The first crank-arm attachment end 14A is a right end of the crank axle 14. The second crank-arm attachment end 14B is a left end of the crank axle 14. However, the crank arm 18 can be a left crank arm, and the additional crank arm 20 can be a right crank arm.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle crank assembly 10, should be interpreted relative to the bicycle equipped with the bicycle crank assembly 10 as used in an upright riding position on a horizontal surface.

As seen in FIG. 1, the crank arm 18 includes a pedal attachment end 22. The pedal attachment end 22 includes a pedal attachment hole 22A. The crank arm 18 includes a pedal-attachment surface 22B. The pedal attachment hole 22A is provided on the pedal-attachment surface 22B. A bicycle pedal (not shown) is attached to the pedal attachment end 22 (more specifically, the pedal attachment hole 22A). The pedal-attachment surface 22B can also be referred to as an axially outermost surface 22B of the crank arm 18.

The additional crank arm 20 includes an additional pedal attachment end 24. The additional pedal attachment end 24 includes an additional pedal attachment hole 24A. The additional crank arm 20 includes an additional pedal-attachment surface 24B. The additional pedal attachment hole 24A is provided on the additional pedal-attachment surface 24B. An additional bicycle pedal (not shown) is attached to the additional pedal attachment end 24 (more specifically, the additional pedal attachment hole 24A). The additional pedal-attachment surface 24B can also be referred to as an additional axially outermost surface 24B of the additional crank arm 20.

A maximum axial distance AD1 is defined between the pedal-attachment surface 22B and the additional pedal-attachment surface 24B in an axial direction D1 of the rotational center axis A1. The maximum axial distance AD1 is equal to or smaller than 150 mm. In this embodiment, the maximum axial distance AD1 is 145. However, the maximum axial distance AD1 is not limited to this embodiment and the above range.

As seen in FIG. 1, the sprocket unit 12 is movable relative to the crank axle 14 in the axial direction D1 of the rotational center axis A1 within a movable range MR having an axial length AL equal to or smaller than 8 mm. The axial length AL of the movable range MR is equal to or smaller than 7 mm. The axial length AL of the movable range MR is equal to or smaller than 5 mm. The axial length AL of the movable range MR is equal to or larger than 4 mm. In this embodiment, the axial length AL of the movable range MR is 4.5 mm. However, the axial length AL of the movable range MR is not limited to this embodiment and the above ranges.

The plurality of driving teeth 36 is movable relative to the crank axle 14 between a first axial position P1 and a second axial position P2 in the axial direction D1. The movable range MR is defined between the first axial position P1 and the second axial position P2. The first axial position P1 is provided between the second axial position P2 and a crank center plane CP1 of the bicycle crank assembly 10 in the axial direction D1. The crank center plane CP1 is defined to bisect the maximum axial distance AD1 in the axial direction D1. For example, the first axial position P1 and the second axial position P2 are defined by an axially outermost surface (e.g., an axially outermost end 12A) of the sprocket unit 12.

Figure 2:
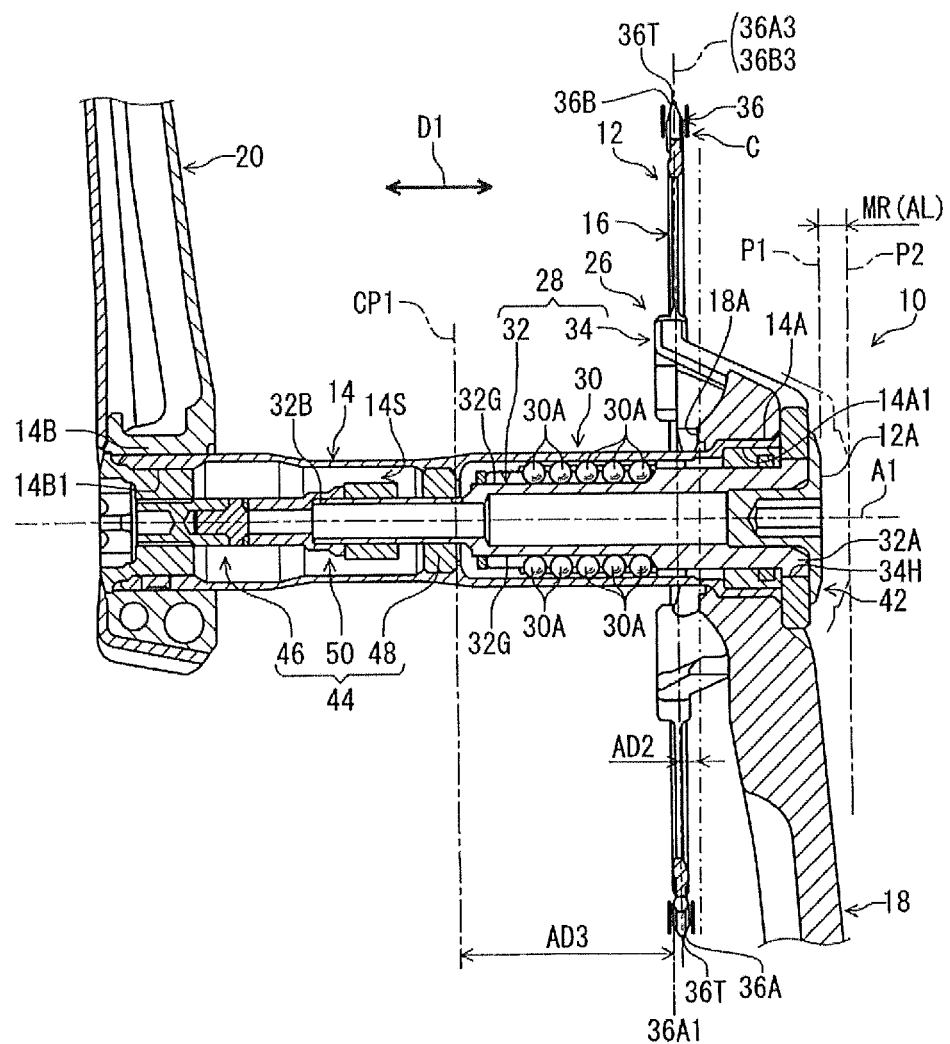
FIG. 2 is a partial cross-sectional view of the bicycle crank assembly illustrated in FIG. 1.

As seen in FIG. 2, the crank axle 14 includes an internal space 14S. The internal space 14S extends between the first crank-arm attachment end 14A and the second crank-arm attachment end 14B along the rotational center axis A1. The first crank-arm attachment end 14A includes a first end opening 14A1. The second crank-arm attachment end 14B includes a second end opening 14B1. The internal space 14S extends between the first end opening 14A1 and the second end opening 14B1 to connect the first end opening 14A1 to the second end opening 14B1.

The sprocket unit 12 includes a coupling member 26 coupled to the sprocket 16 to support the sprocket 16 movably relative to the crank axle 14 in the axial direction D1. The coupling member 26 includes an adaptor 28 and a slidable member 30. The adaptor 28 is coupled to the sprocket 16 and is at least partly provided in the internal space 14S of the crank axle 14. The slidable member 30 is slidably supports the adaptor 28 with respect to the crank axle 14 in the internal space 14S of the crank axle 14.

The adaptor 28 includes a movable member 32 and an attachment member 34. The movable member 32 is movably provided in the internal space 14S of the crank axle 14 in the axial direction D1. The attachment member 34 couples the sprocket 16 to the movable member 32. The movable member 32 extends from the attachment member 34 in the axial direction D1. The movable member 32 extends through the first end opening 14A1 of the first crank-arm attachment end 14A.

As seen in FIG. 2, the movable member 32 includes a first axial end 32A and a second axial end 32B. The movable member 32 extends between the first axial end 32A and the second axial end 32B. The attachment member 34 includes an attachment hole 34H. The first axial end 32A is provided in the attachment hole 34H.

The movable member 32 is press-fitted and/or caulked to the attachment member 34. The first axial end 32A of the movable member 32 is press-fitted and/or caulked in the attachment hole 34H of the attachment member 34. In this embodiment, the first axial end 32A includes an external spline. The attachment member 34 includes an internal spline meshing with the external spline of the first axial end 32A. The first axial end 32A of the movable member 32 is press-fitted in the attachment hole 34H of the attachment member 34. However, the movable member 32 can be caulked in the attachment hole 34H of the attachment member 34 instead of or in addition to press-fitting.

In this embodiment, the movable member 32 is a separate member from the attachment member 34. However, the movable member 32 can be integrally provided with the attachment member 34 as a one-piece unitary member. The attachment member 34 is a separate member from the sprocket 16. However, the movable member 32 can be provided integrally with the sprocket 16 as a one-piece unitary member.

The slidable member 30 slidably supports the slidable member 28 with respect to the crank axle 14 in the internal space 14S of the crank axle 14. In this embodiment, the slidable member 30 is slidably movable with respect to the crank axle 14 in the axial direction D1. However, the slidable member 30 can be configured to be stationary with respect to the crank axle 14 in the axial direction. In this embodiment, the slidable member 30 includes a plurality of rolling elements 30A (e.g., a plurality of balls). The movable member 32 includes a plurality of guide grooves 32G extending along the rotational center axis A1. The rolling element 30A is rotatably provided in the guide groove 32G. However, the slidable member 30 is not limited to this embodiment. For example, the slidable member 30 can includes another structure such as a bushing, instead of or in addition to the plurality of rolling elements 30A.

Figure 3:
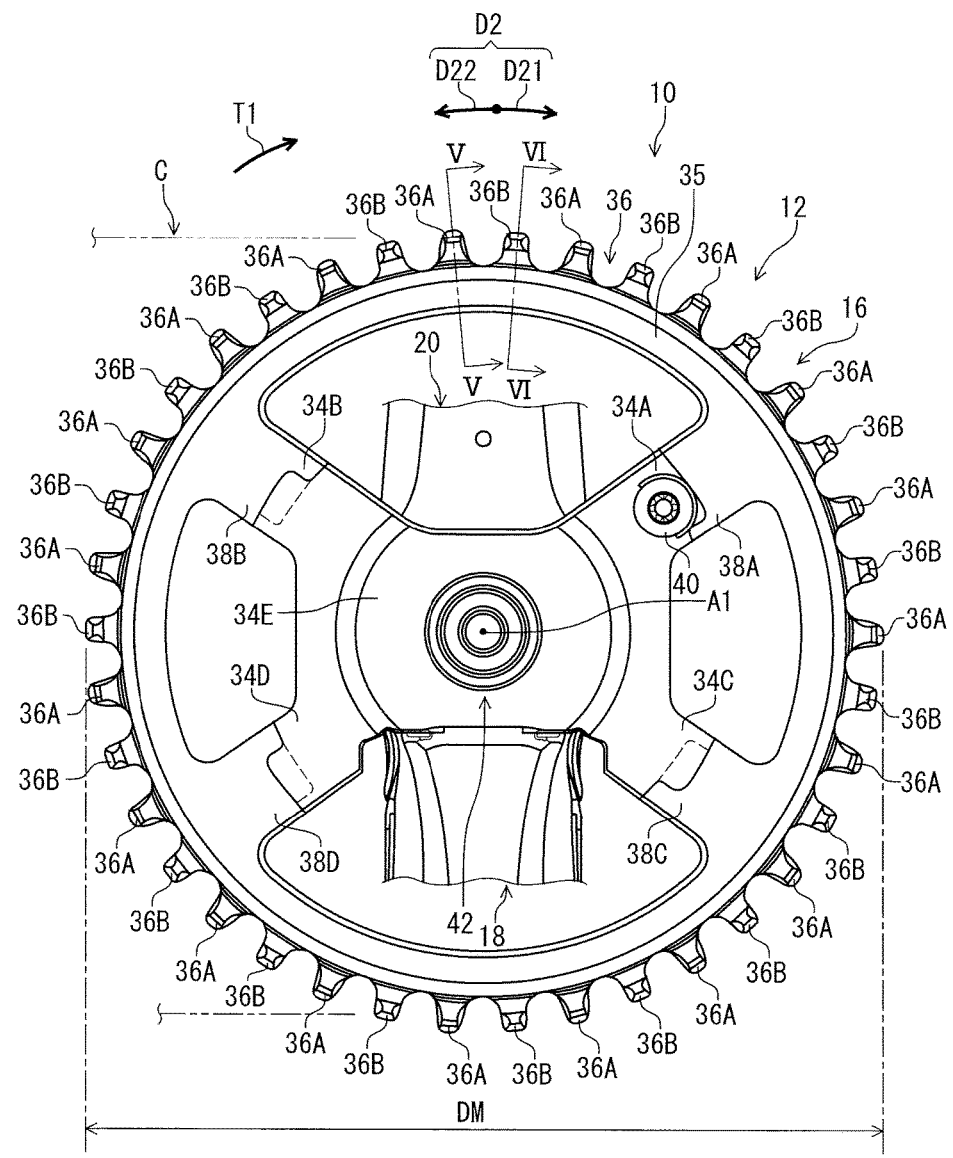
FIG. 3 is a side elevational view of the bicycle crank assembly illustrated in FIG.

As seen in FIG. 3 the bicycle crank assembly 10 is rotatable relative to a bicycle frame (not shown) about the rotational center axis A1 in a driving rotational direction D21 during pedaling. The driving rotational direction D21 is defined along a circumferential direction D2 of the bicycle crank assembly 10. A reverse rotational direction D22 is opposite to the driving rotational direction D21 and is defined along the circumferential direction D2. A pedaling torque T1 is transmitted from at least one of the crank arm 18 and the additional crank arm 20 to the sprocket unit 12 via the crank axle 14 during pedaling.

The attachment member 34 includes a first attachment arm 34A, a second attachment arm 34B, a third attachment arm 34C, a fourth attachment arm 34D, and an attachment body 34E. The first to fourth attachment arms 34A to 34D extend radially outwardly from the attachment body 34E. The first to fourth attachment arms 34A to 34D are spaced apart from each other in the circumferential direction D2.

As seen in FIG. 3, the sprocket 16 includes a sprocket ring 35. The sprocket 16 includes a plurality of driving teeth 36. The plurality of driving teeth 36 extends radially outwardly from the sprocket ring 35. The sprocket 16 includes a first coupling part 38A, a second coupling part 38B, a third coupling part 38C, and a fourth coupling part 38D. The first to fourth coupling parts 38A to 38D extends radially inwardly from the sprocket ring 35. The first to fourth coupling parts 38A to 38D are spaced apart from each other in the circumferential direction D2. The first coupling part 38A is attached to the first attachment arm 34A. The second coupling part 38B is attached to the second attachment arm 34B. The third coupling part 38C is attached to the third attachment arm 34C. The fourth coupling part 38D is attached to the fourth attachment arm 34D.

In this embodiment, the sprocket unit 12 includes a sprocket fastener 40 such as a screw or a rivet. The sprocket ring 35 is secured to the attachment member 34 with the sprocket fastener 40. The first coupling part 38A is secured to the first attachment arm 34A with the sprocket fastener 40. However, the sprocket fastener 40 can be omitted from the sprocket unit 12. In this embodiment, the attachment member 34 of the coupling member 26 is a separate member from the sprocket 16. However, the attachment member 34 can be integrally provided with the sprocket 16 as a one-piece unitary member.

As seen in FIG. 3, the total number of the plurality of driving teeth 36 is equal to or larger than 38. The total number of the plurality of driving teeth 36 is equal to or smaller than 55. In this embodiment, the total number of the plurality of driving teeth 36 is 38. As seen in modifications of FIG. 4, however, the total number of the plurality of driving teeth 36 can be equal to or larger than 40. The total number of the plurality of driving teeth 36 can be equal to or larger than 42. The total number of the plurality of driving teeth 36 is not limited to this embodiment and the above ranges.

As seen in FIG. 3, the plurality of driving teeth 36 includes at least one first tooth 36A and at least one second tooth 36B. The at least one first tooth 36A is adjacent to the at least one second tooth 36B in the circumferential direction D2 of the rotational center axis A1 without another tooth therebetween. In this embodiment, the plurality of driving teeth 36 includes a plurality of first teeth 36A and a plurality of second teeth 36B. The first teeth 36A and the second teeth 36B are alternately arranged in the circumferential direction D2. A total number of the first teeth 36A is equal to a total number of the second teeth 36B. However, the total number of the first teeth 36A is not limited to this embodiment. The total number of the second teeth 36B is not limited to this embodiment.

Figure 5:
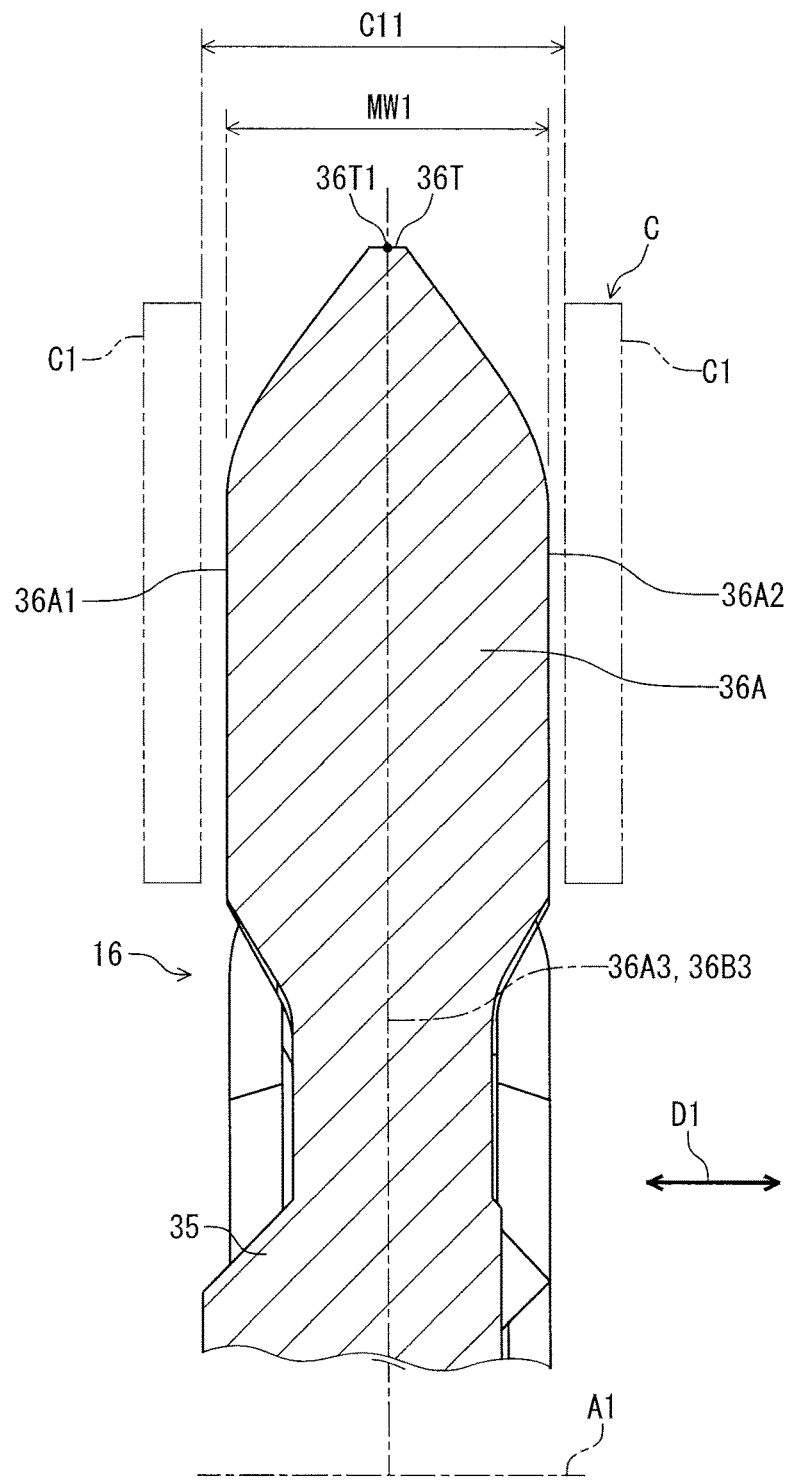
FIG. 5 is a cross-sectional view of a sprocket of the sprocket unit taken along line V-V of FIG. 3.

As seen in FIG. 5, the first tooth 36A extends radially outwardly from the sprocket ring 35 to be received in only an outer link space C11 of the bicycle chain C. The outer link space C11 is provided between an opposed pair of outer link plates C1. The at least one first tooth 36A has a first axial width MW1 defined in the axial direction D1. The first tooth 36A includes a first axial surface 36A1 and a first axial reverse surface 36A2. The first axial surface 36A1 faces in the axial direction D1. The first axial reverse surface 36A2 faces in the axial direction D1 and is provided on a reverse side of the first axial surface 36A1. The first axial width MW1 is defined between the first axial surface 36A1 and the first axial reverse surface 36A2 in the axial direction D1. The first tooth 36A has a first center plane 36A3 defined to bisect the first axial width MW1 in the axial direction D1. The first center plane 36A3 is perpendicular to the rotational center axis A1. The first tooth 36A includes a first tooth tip 36T having a first axial center 36T1. The first tooth tip 36T can also be referred to as a tooth tip 36T. The first axial center 36T1 can also be referred to as an axial center 36T1. In this embodiment, the first axial center 36T1 is provided on the first center plane 36A3. However, the first axial center 36T1 can be offset from the first center plane 36A3.

Figure 6:
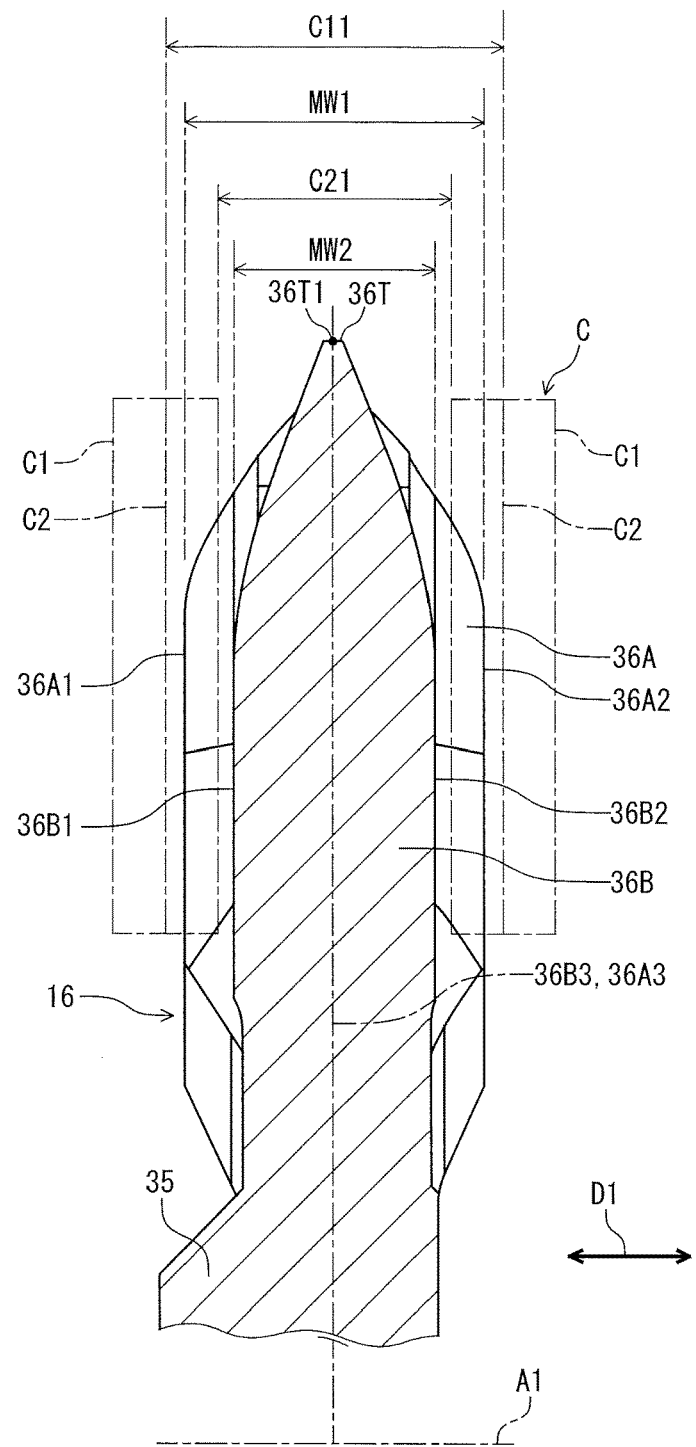
FIG. 6 is a cross-sectional view of the sprocket taken along line VI-VI of FIG. 3.
Figure 7:
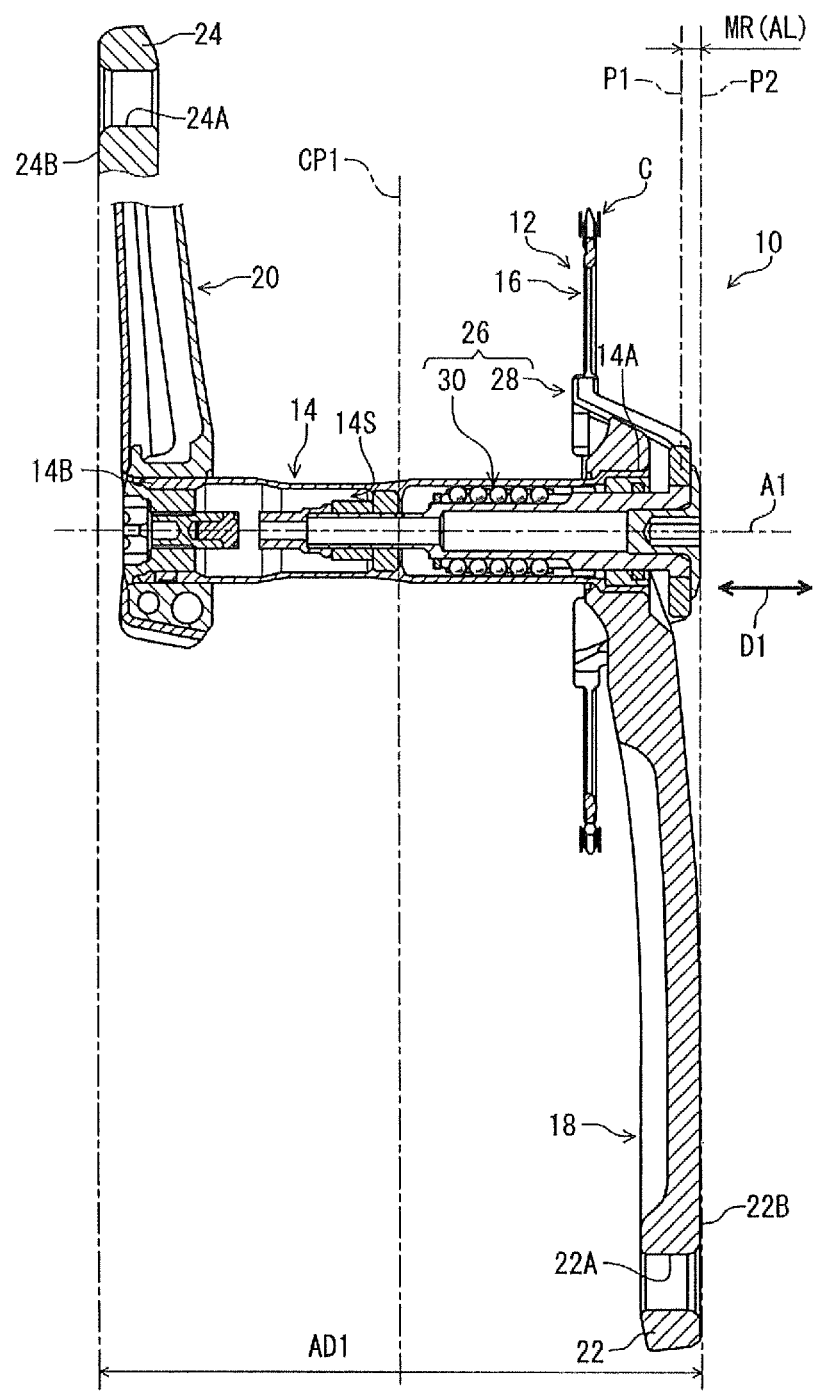
FIG. 7 is a cross-sectional view of the bicycle crank assembly illustrated in FIG. 1 (second axial position).

As seen in FIG. 6, the second tooth 36B extends radially outwardly from the sprocket ring 35 to be received in only an inner link space C21 of the bicycle chain C. The inner link space C21 is provided between an opposed pair of inner link plates C2. The at least one second tooth 36B has a second axial width MW2 defined in the axial direction D1. The second tooth 36B includes a second axial surface 36B1 and a second axial reverse surface 36B2. The second axial surface 36B1 faces in the axial direction D1. The second axial reverse surface 36B2 faces in the axial direction D1 and is provided on a reverse side of the second axial surface 36B1. The second axial width MW2 is defined between the second axial surface 36B1 and the second axial reverse surface 36B2 in the axial direction D1. The second tooth 36B has a second center plane 36B3 defined to bisect the second axial width MW2 in the axial direction D1. The second center plane 36B3 is perpendicular to the rotational center axis A1. In this embodiment, the second center plane 36B3 is coincident with the first center plane 36A3 in the axial direction D1. However, the second center plane 36B3 can be offset from the first center plane 36A3 in the axial direction D1. The second tooth 36B includes a second tooth tip 36T having an axial center 36T1. The second tooth tip 36T can also be referred to as a tooth tip 36T. The second axial center 36T1 can also be referred to as an axial center 36T1. In this embodiment, the second axial center 36T1 is provided on the second center plane 36B3. However, the second axial center 36T1 can be offset from the second center plane 36B3.

In this embodiment, the first axial width MW1 is larger than the second axial width MW2. The first axial width MW1 is smaller than an axial width of the outer link space C11 and is larger than an axial width of the inner link space C21. The second axial width MW2 is smaller than the axial width of the inner link space C21. However, the first axial width MW1 can be equal to or smaller than the second axial width MW2.

The sprocket 16 has an outer diameter DM equal to or larger than 145 mm. The plurality of driving teeth 36 define the outer diameter DM. In this embodiment, the outer diameter DM of the sprocket 16 is 148 mm. However, the outer diameter DM of the sprocket 16 is not limited to this embodiment and the above range.

As seen in FIG. 2, the crank arm 18 includes an axially innermost surface 18A which is the closest to the crank center plane CP1 in the axial direction D1 in the crank arm 18. The plurality of driving teeth 36 is provided between the axially innermost surface 18A and the crank center plane CP1 in the axial direction D1 in a state where the plurality of driving teeth 36 is in the first axial position P1. An axial distance AD2 is defined between the axially innermost surface 18A and the plurality of tooth tips 36T of the plurality of driving teeth 36 in the axial direction D1 in the state where the plurality of driving teeth 36 is in the first axial position P1. The axial distance AD2 is equal to or smaller than 4 mm. In this embodiment, the axial distance AD2 is 4 mm. However, the axial distance AD2 is not limited to this embodiment and the above range. In this embodiment, the axial distance AD2 is defined between the axially innermost surface 18A and the plurality of axial centers 36T1 (FIGS. 5 and 6) of the tooth tips 36T of the plurality of driving teeth 36 in the axial direction D1.

The sprocket unit 12 includes the axially outermost end 12A which is the farthest from the crank center plane CP1 in the axial direction D1 in the sprocket unit 12. In this embodiment, the sprocket unit 12 includes a cap 42 attached to the movable member 32 of the coupling member 26. The cap 42 is attached to the first axial end 32A of the movable member 32. The axially outermost end 12A is provided on the cap 42. The cap 42 is attached to the movable member 32 to prevent the coupling member 26 from coming off the movable member 32. However, the cap 42 can be omitted from the sprocket unit 12. In this case, one of the movable member 32 and the coupling member 25 defines the axially outermost end 12A of the sprocket unit 12. Therefore, it is possible to expand the movable range MR of the sprocket unit 12 in the axial direction D1.

As seen in FIG. 1, the crank arm 18 includes the axially outermost surface 22B which is the farthest from the crank center plane CP1 in the axial direction D1 in the crank arm 18. The axially outermost end 12A of the sprocket unit 12 is positioned in an axial position equal to an axial position of the axially outermost surface 22B in a state where the sprocket unit 12 is in the second axial position P2, or positioned in an axial position closer to the crank center plane CP1 than the axially outermost surface 22B in the axial direction D1 in the state where the sprocket unit 12 is in the second axial position P2.

Figure 8:
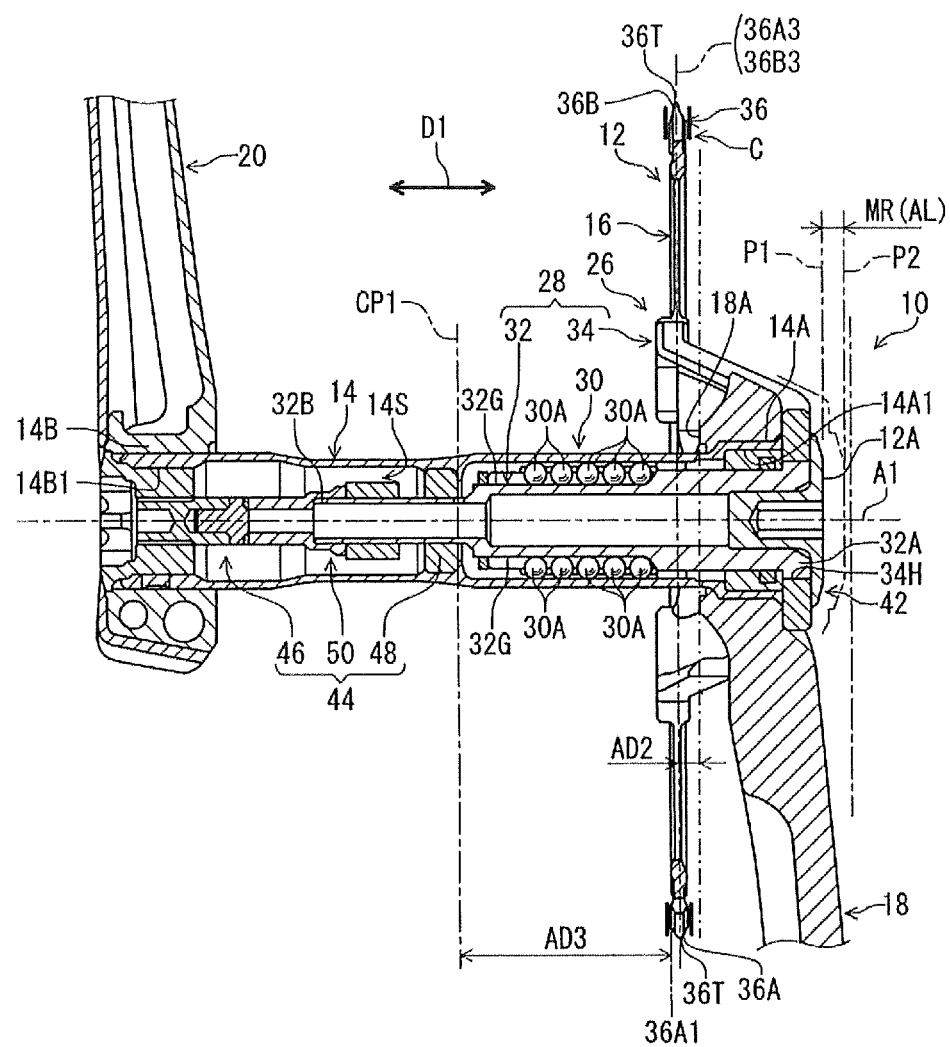
FIG. 8 is a cross-sectional view of a bicycle crank assembly in accordance with a modification (second axial position).

In this embodiment, the axially outermost end 12A of the sprocket unit 12 is positioned in the axial position equal to the axial position of the axially outermost surface 22B in the state where the sprocket unit 12 is in the second axial position P2. As seen in FIG. 8, however, the axially outermost end 12A of the sprocket unit 12 is positioned in an axial position closer to the crank center plane CP1 than the axially outermost surface 22B in the axial direction D1 in the state where the sprocket unit 12 is in the second axial position P2.

As seen in FIG. 2, a minimum axial distance AD3 is defined between the crank center plane CP1 and the plurality of driving teeth 36 in the axial direction D1 in a state where the plurality of driving teeth 36 is in the first axial position P1. The minimum axial distance AD3 is equal to or larger than 38 mm. The minimum axial distance AD3 is equal to or larger than 40 mm. In this embodiment, the minimum axial distance AD3 is 40 mm. However, the minimum axial distance AD3 is not limited to this embodiment and the above ranges. The minimum axial distance AD3 is defined between the crank center plane CP1 and the first axial surface 36A1 (FIG. 5) of the first tooth 36A in the axial direction D1 in the state where the plurality of driving teeth 36 is in the first axial position P1.

As seen in FIG. 2, the bicycle crank assembly 10 comprises a stopper structure 44. The stopper structure 44 is provided in the internal space 14S of the crank axle 14 to restrict an axial movement of the movable member 32 relative to the crank axle 14 between the first axial position P1 and the second axial position P2.

The stopper structure 44 includes a first stopper 46, a second stopper 48, and a receiving member 50. The first stopper 46 is coupled to the crank axle 14 and is provided in the internal space 14S. The second stopper 48 is coupled to the crank axle 14 and is provided in the internal space 14S. The first stopper 46 is spaced apart from the second stopper 48 in the axial direction D1. The receiving member 50 is attached to the second axial end 32B of the movable member 32. The receiving member 50 is provided between the first stopper 46 and the second stopper 48 in the axial direction D1. The receiving member 50 is in contact with the first stopper 46 in the state where the sprocket unit 12 is in the first axial position P1. The receiving member 50 is in contact with the second stopper 48 in the state where the sprocket unit 12 is in the second axial position P2.

The first stopper 46 can be coupled to the crank axle 14 to change a position of the first stopper 46 relative to the crank axle 14 in the axial direction D1. Such structure allows the first axial position P1 to be changed relative to the crank axle 14 in the axial direction D1. In such an embodiment, the movable range MR is defined as a maximum movable range of the sprocket unit 12. Namely, the maximum movable range of the sprocket unit 12 is set to be equal to or smaller than 8 mm. Other numerical values and/or ranges (e.g., the axial distance AD2 and the minimum axial distance AD3) defined based on the first axial position P1 are set based on the maximum movable range of the sprocket unit 12.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle crank assembly comprising:
a sprocket unit including a sprocket having a rotational center axis, the sprocket including a plurality of driving teeth, a total number of the plurality of driving teeth being equal to or larger than 38; and
a crank axle extending along the rotational center axis, the sprocket unit being movable relative to the crank axle in an axial direction of the rotational center axis within a movable range having an axial length equal to or smaller than 8 mm, wherein
the plurality of driving teeth is movable relative to the crank axle between a first axial position and a second axial position in the axial direction, and
the movable range is defined between the first axial position and the second axial position by a stopper structure provided in the crank axle.

2. The bicycle crank assembly according to claim 1, wherein
the first axial position is provided between the second axial position and a crank center plane of the bicycle crank assembly in the axial direction.

3. The bicycle crank assembly according to claim 2, wherein
a minimum axial distance is defined between the crank center plane and the plurality of driving teeth in the axial direction in a state where the plurality of driving teeth is in the first axial position, and
the minimum axial distance is equal to or larger than 38 mm.

4. The bicycle crank assembly according to claim 3, wherein
the minimum axial distance is equal to or larger than 40 mm.

5. The bicycle crank assembly according to claim 2, wherein
the sprocket unit includes an axially outermost end which is the farthest end of the sprocket unit from the crank center plane in the axial direction in the sprocket unit,
the crank arm includes an axially outermost surface which is the farthest surface of the crank arm from the crank center plane in the axial direction in the crank arm, and
the axially outermost end of the sprocket unit is:
positioned in an axial position equal to an axial position of the axially outermost surface in a state where the sprocket unit is in the second axial position, or
positioned in an axial position closer to the crank center plane than the axially outermost surface in the axial direction in the state where the sprocket unit is in the second axial position.

6. The bicycle crank assembly according to claim 1, wherein
the sprocket unit includes a coupling member coupled to the sprocket to support the sprocket movably relative to the crank axle in the axial direction.

7. The bicycle crank assembly according to claim 1, wherein
the axial length of the movable range is equal to or smaller than 7 mm.

8. The bicycle crank assembly according to claim 7, wherein
the axial length of the movable range is equal to or smaller than 5 mm.

9. The bicycle crank assembly according to claim 8, wherein
the axial length of the movable range is equal to or larger than 4 mm.

10. The bicycle crank assembly according to claim 1, wherein
the total number of the plurality of driving teeth is equal to or larger than 40.

11. The bicycle crank assembly according to claim 10, wherein
the total number of the plurality of driving teeth is equal to or larger than 42.

12. The bicycle crank assembly according to claim 11, wherein
the total number of the plurality of driving teeth is equal to or smaller than 55.

13. The bicycle crank assembly according to claim 1, wherein
the sprocket has an outer diameter equal to or larger than 145 mm.

14. The bicycle crank assembly according to claim 1, further comprising:
a crank arm secured to the crank axle, the crank arm includes a pedal-attachment surface; and an additional crank arm secured to the crank axle, the additional crank arm including an additional pedal-attachment surface, wherein a maximum axial distance is defined between the pedal-attachment surface and the additional pedal-attachment surface in the axial direction, and the maximum axial distance is equal to or smaller than 150 mm.

15. The bicycle crank assembly according to claim 1, wherein the plurality of driving teeth includes:

at least one first tooth having a first axial width defined in the axial direction, and at least one second tooth having a second axial width defined in the axial direction, the first axial width being larger than the second axial width, and the at least one first tooth is adjacent to the at least one second tooth in a circumferential direction of the rotational center axis without another tooth therebetween.

16. A bicycle crank assembly comprising:

a sprocket unit including a sprocket having a rotational center axis, the sprocket including a plurality of driving teeth, a total number of the plurality of driving teeth being equal to or larger than 38; and a crank axle extending along the rotational center axis, the sprocket unit being movable relative to the crank axle in an axial direction of the rotational center axis within a movable range having an axial length equal to or smaller than 8 mm, wherein the sprocket unit includes a coupling member coupled to the sprocket to support the sprocket movably relative to the crank axle in the axial direction, the coupling member includes an adaptor and a slidable member, the adaptor is coupled to the sprocket and is at least partly provided in an internal space of the crank axle, and the slidable member slidably supports the adaptor with respect to the crank axle in the internal space of the crank axle.

17. The bicycle crank assembly according to claim 16, wherein the adaptor includes a movable member and an attachment member, the movable member is movably provided in the internal space of the crank axle in the axial direction, the attachment member couples the sprocket to the movable member, and the movable member is press-fitted and/or caulked to the attachment member.

18. A bicycle crank assembly comprising:

a sprocket unit including a sprocket having a rotational center axis, the sprocket including a plurality of driving teeth, a total number of the plurality of driving teeth being equal to or larger than 38; and a crank axle extending along the rotational center axis, the sprocket unit being movable relative to the crank axle in an axial direction of the rotational center axis within a movable range having an axial length equal to or smaller than 8 mm, wherein the plurality of driving teeth is movable relative to the crank axle between a first axial position and a second axial position in the axial direction, the movable range is defined between the first axial position and the second axial position, the first axial position is provided between the second axial position and a crank center plane of the bicycle crank assembly in the axial direction, the bicycle crank assembly further comprises a crank arm including an axially innermost surface which is the closest surface of the crank arm to the crank center plane in the axial direction in the crank arm, and the plurality of driving teeth is provided between the axially innermost surface and the crank center plane in the axial direction in a state where the plurality of driving teeth is in the first axial position.

19. The bicycle crank assembly according to claim 18, wherein an axial distance is defined between the axially innermost surface and a plurality of tooth tips of the plurality of driving teeth in the axial direction in the state where the plurality of driving teeth is in the first axial position, and the axial distance is equal to or smaller than 4 mm.

* * * * *